United States Patent
Anspaugh et al.

(10) Patent No.: US 11,203,374 B2
(45) Date of Patent: Dec. 21, 2021

(54) CLAMP MECHANISM WITH PIVOTING FRICTION PLATE FOR ADJUSTABLE STEERING COLUMN

(71) Applicant: STEERING SOLUTIONS IP HOLDING CORPORATION, Saginaw, MI (US)

(72) Inventors: Michael P. Anspaugh, Bay City, MI (US); Ethan S. Jacobs, Kawkawlin, MI (US); Albert C. Huber, Montrose, MI (US); Jarrod C. Sherwood, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 64 days.

(21) Appl. No.: 16/733,604

(22) Filed: Jan. 3, 2020

(65) Prior Publication Data
US 2021/0206420 A1 Jul. 8, 2021

(51) Int. Cl.
*B62D 1/184* (2006.01)
(52) U.S. Cl.
CPC .................. *B62D 1/184* (2013.01)
(58) Field of Classification Search
CPC ........ B62D 1/184; B62D 1/185; B62D 1/187; B62D 1/19; B62D 1/192
See application file for complete search history.

(56) References Cited

U.S. PATENT DOCUMENTS

| | | | | |
|---|---|---|---|---|
| 6,357,318 B1 * | 3/2002 | Koellisch | ............... | B62D 1/184 280/775 |
| 6,419,269 B1 * | 7/2002 | Manwaring | ............ | B62D 1/184 280/775 |
| 8,047,096 B2 * | 11/2011 | Ridgway | ............... | B62D 1/184 74/493 |
| 8,123,251 B2 | 2/2012 | Olgren et al. | | |
| 8,881,618 B2 | 11/2014 | Buzzard et al. | | |
| 8,904,901 B2 * | 12/2014 | Mashimo | ............... | B62D 1/184 74/492 |
| 9,039,042 B2 | 5/2015 | Moriyama | | |
| 9,162,700 B2 * | 10/2015 | Tinnin | .................. | B62D 1/184 |
| 9,162,701 B2 | 10/2015 | Buzzard et al. | | |

(Continued)

FOREIGN PATENT DOCUMENTS

JP 2012011837 A * 1/2012 ............. B62D 1/184

*Primary Examiner* — Laura Freedman
(74) *Attorney, Agent, or Firm* — Dickinson Wright PLLC (57) ABSTRACT

Technical solutions are described for a clamp mechanism of an adjustable steering column assembly. The clamp mechanism comprises a fixed bracket configured for rigid attachment to a vehicle, and a movable bracket configured to hold a steering shaft. An adjustment nut threadedly engages an adjustment bolt, the adjustment nut or the adjustment bolt moves between an adjustment position and a holding position, selectively coupling the movable bracket to the fixed bracket in the holding position. The fixed bracket defines a first slotted aperture to guide the adjustment bolt in a linear path for adjusting a position of the steering shaft. A positive locking member moves to a locked position, blocking the adjustment bolt from moving along the first slotted aperture in a crash event. A friction plate is pivotably coupled to the fixed bracket to pivot as the positive locking member moves between an unlocked position and the locked position.

17 Claims, 8 Drawing Sheets

(56) References Cited

U.S. PATENT DOCUMENTS

| | | |
|---|---|---|
| 9,428,210 B2 | 8/2016 | Anspaugh et al. |
| 9,764,757 B2 | 9/2017 | Buzzard et al. |
| 10,023,223 B2 * | 7/2018 | Anspaugh .............. B62D 1/184 |

* cited by examiner

CLAMP MECHANISM WITH PIVOTING FRICTION PLATE FOR ADJUSTABLE STEERING COLUMN

BACKGROUND

The present application is generally related to a clamp mechanism for an adjustable steering column assembly of a vehicle. More specifically, the present application is related to a clamp mechanism having an adjustment bolt that is movable between an adjustment position and a holding position to selectively couple the movable bracket to the fixed bracket in the holding position. The adjustment bolt may be moved along slotted apertures to adjust a position of the steering column when the clamp mechanism is in the adjustment position. The holding position may be used to hold the steering column assembly in a given position during normal operation. The clamp assembly must withstand forces in the holding position which may be generated, for example, when a person pulls or leans upon a steering wheel while entering or exiting the vehicle.

Adjustable steering columns may employ a positive locking member to block the adjustment bolt from excess movement along the slotted apertures in a locked position. Such a positive locking member may provide locking force to maintain a position of the steering column, e.g. in case of a crash. Some conventional adjustable steering columns may employ a clamp mechanism for holding the steering column assembly in a given position during normal operation. In some conventional designs, the holding force of the clamp mechanism in the holding position can limit the ability of a positive locking mechanism to move to the locked position for crash-related holding.

Accordingly, it is desirable to provide a clamp mechanism for an adjustable steering column and which provides for a positive locking member to shuttle to the locked position independent of the holding force of the clamp mechanism.

SUMMARY

According to one or more embodiments, a clamp mechanism for an adjustable steering column assembly of a vehicle includes a fixed bracket configured for rigid attachment to the vehicle, and a movable bracket configured to hold a steering shaft. The clamp mechanism also includes an adjustment nut threadedly engaging an adjustment bolt, with at least one of the adjustment nut or the adjustment bolt movable between an adjustment position and a holding position to selectively couple the movable bracket to the fixed bracket in the holding position. The fixed bracket defines a first slotted aperture that is configured to guide the adjustment bolt in a linear path for adjusting a position of the steering shaft. The clamp mechanism also includes a positive locking member that is movable between an unlocked position and a locked position. The positive locking member blocks the adjustment bolt from moving along the first slotted aperture in the locked position. The clamp mechanism also includes a friction plate that is pivotably coupled to the fixed bracket and configured to pivot with the positive locking member moving between the unlocked position and the locked position.

According to one or more embodiments, an adjustable steering column assembly for a vehicle comprises a steering shaft, a fixed bracket configured for rigid attachment to the vehicle, a movable bracket fixed to the steering shaft, and an adjustment nut threadedly engaging an adjustment bolt. At least one of the adjustment nut or the adjustment bolt is movable between an adjustment position and a holding position and configured to selectively couple the movable bracket to the fixed bracket in the holding position. At least one of the fixed bracket or the movable bracket defines a slotted aperture configured to guide the adjustment bolt in a linear path. The adjustable steering column assembly also includes a positive locking member that is movable between an unlocked position and a locked position. The positive locking member blocks the adjustment bolt from moving along the slotted aperture in the locked position. The adjustable steering column assembly also includes a friction plate pivotably coupled to the fixed bracket and configured to pivot with the positive locking member moving between the unlocked position and the locked position.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Clamp mechanisms of the present disclosure provide several advantages over those in conventional adjustable steering column assemblies. The clamp mechanisms of the present disclosure reduce input loads required to shuttle a positive locking clamp mechanism by decoupling the holding force of the holding position from movement of the positive locking clamp between unlocked and locked positions. In other words, the clamp mechanisms of the present disclosure provide for a positive locking clamp that is movable between unlocked and locked positions (e.g. in response to a crash load) independent of any clamping or holding force that maintains a position of the steering column under normal (i.e. non-crash) operating conditions.

The clamp mechanisms of the present disclosure provide for additional benefits over conventional clamp mechanisms. For example, the clamp mechanisms of the present disclosure minimize the need for plate geometry and attachment precision. They provide enhanced rake adjust holding loads, they provide for negligible lash with simple attachments. Additionally, the clamp mechanisms of the present disclosure avoid rake adjustment binding without the need for part precision at multiple interfaces.

Figure 1:
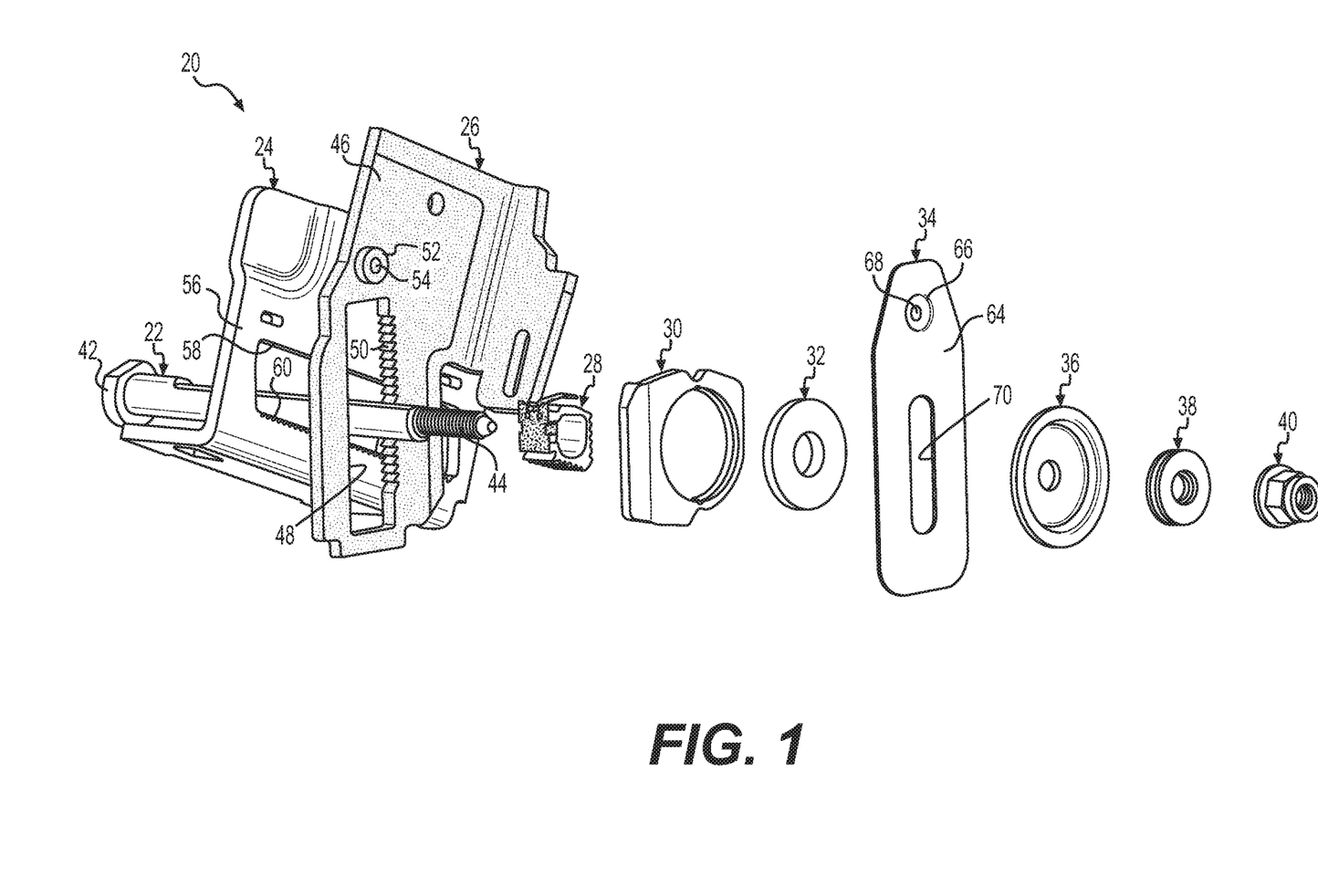
FIG. 1 depicts an exploded view of a clamp mechanism for an adjustable steering column according to aspects of the present disclosure.

Referring now to the figures, where the technical solutions will be described with reference to specific embodiments, without limiting same, FIG. 1 shows an exemplary embodiment of a clamp mechanism 20 for an adjustable steering column of a vehicle according to aspects of the present disclosure. More specifically, FIG. 1 depicts an exploded view of the clamp mechanism 20. From left to right, the clamp mechanism 20 includes main components of an adjustment bolt 22, a movable bracket 24, a fixed bracket 26, a positive locking member 28, a lock retainer 30, a first washer 32, a friction plate 34, a second washer 36, a third washer 38, and an adjustment nut 40. The fixed bracket 26 is configured for rigid attachment to the vehicle, and the movable bracket 24 is configured to hold a steering shaft (not shown). The clamp mechanism 20, thus selectively holds the steering shaft in a fixed position in the vehicle. The positive locking member 28 is configured to hold the adjustment bolt 22 in a fixed position relative to either or both of the fixed bracket 26 and/or the movable bracket 24 in the locked position. Likewise, the adjustment bolt 22 may be free to move relative to either or both of the fixed bracket 26 and/or the movable bracket 24 with the positive locking member 28 in the unlocked position.

The adjustment nut 40 threadedly engages the adjustment bolt 22, securing each of the movable bracket 24, fixed bracket 26, positive locking member 28 lock retainer 30, first washer 32, friction plate 34, second washer 36, and the third washer 38 in a stacked arrangement, each disposed around the adjustment bolt 22. The adjustment bolt 22 extends between a head 42 and a threaded end 44 configured for threading into the adjustment nut 40. In operation, at least one of the adjustment nut 40 or the adjustment bolt 22 is movable between an adjustment position and a holding position to selectively couple the movable bracket to the fixed bracket. For example, the adjustment nut 40 may be tightened onto the adjustment bolt 22 causing a clamping force to couple the movable bracket 24 to the fixed bracket 26 in the holding position. Likewise, the adjustment nut 40 may be loosened on the adjustment bolt 22, releasing the clamping force and allowing relative motion between the movable bracket 24 and the fixed bracket 26 in the adjustment position. A leaver or a handle (not shown) may attach to either or both of the head 42 of the adjustment bolt 22 and/or to the adjustment bolt 22 for adjusting the clamp mechanism 20 to the holding position or the adjustment position. In some embodiments, the third washer 38 is a compression washer or needle bearing configured to support compression load, with the adjustment nut and the adjustment bolt in the holding position, while minimizing addition of resistive turning torque against the leaver and adjustment nut 40 during leaver lock or unlock motion. The compression washer or needle bearing, by supporting compression load, maintains and/or regulates the clamping force applied to the friction plate 34.

Still referring to FIG. 1, the fixed bracket 26 includes a first side plate 46 that extends perpendicularly to the adjustment bolt 22 and vertically with the clamp mechanism 20 installed in a vehicle. The first side plate 46 of the fixed bracket 26 defines a first slotted aperture 48 configured to guide the adjustment bolt 22 in a linear path for adjusting a position of the steering shaft. More specifically, the first slotted aperture 48 extends vertically for adjusting an up/down motion of the steering shaft. In some embodiments, movement of the adjustment bolt 22 within the first slotted aperture 48 may correspond to the steering column moving in an up/down tilting direction, which may also be called a tilt or a rake degree of freedom. A stand-off protrusion 52 having a cylindrical shape extends outwardly from the first side plate 46 of the fixed bracket 26 for spacing the friction plate 34 off of the first side plate 46. The stand-off protrusion 52 is in line with and spaced apart from the first slotted aperture 48. A first pivot hole 54 extends through the stand-off protrusion 52 for receiving a pin (not shown) for pivotably coupling the friction plate 34 to the fixed bracket 26.

Similarly to the fixed bracket 26, the movable bracket 24 includes a second side plate 56 that extends parallel and adjacent to the first side plate 46 of the fixed bracket 26. The second side plate 56 of the movable bracket 24 defines a second slotted aperture 58 configured to guide the adjustment bolt 22 in a second linear path for adjusting a position or a length of the steering shaft. More specifically, the second slotted aperture 58 extends transverse to the first slotted aperture 48 and parallel to the steering shaft for adjusting a length of the steering shaft. In some embodiments, movement of the adjustment bolt 22 within the second slotted aperture 58 may correspond to the steering column adjusting in length telescopically. Such adjustment may be called a telescopic degree of freedom.

The friction plate 34 includes a plate body 64 having a flat and elongated shape. The plate body 64 may be made of sheet metal or a similar material. A circular depression 66 is formed in the plate body 64 near one end of the elongated shape. A second pivot hole 68 extends through the plate body 64 within the circular depression 66 for receiving a pin (not shown) for pivotably coupling the friction plate 34 to the fixed bracket 26, with the circular depression 66 aligned over the stand-off protrusion 52, positioning the plate body 64 of the friction plate 35 parallel to and spaced apart from the first side plate 46 of the fixed bracket 26. The plate body 64 of the friction plate 34 also defines an adjustment slot 70 therethrough and extending along the elongated shape and configured to receive the adjustment bolt 22 therethrough. The adjustment slot 70 extends parallel to the first slotted aperture 48 of the fixed bracket 26 with the positive locking member 28 in the unlocked position.

Figure 2:
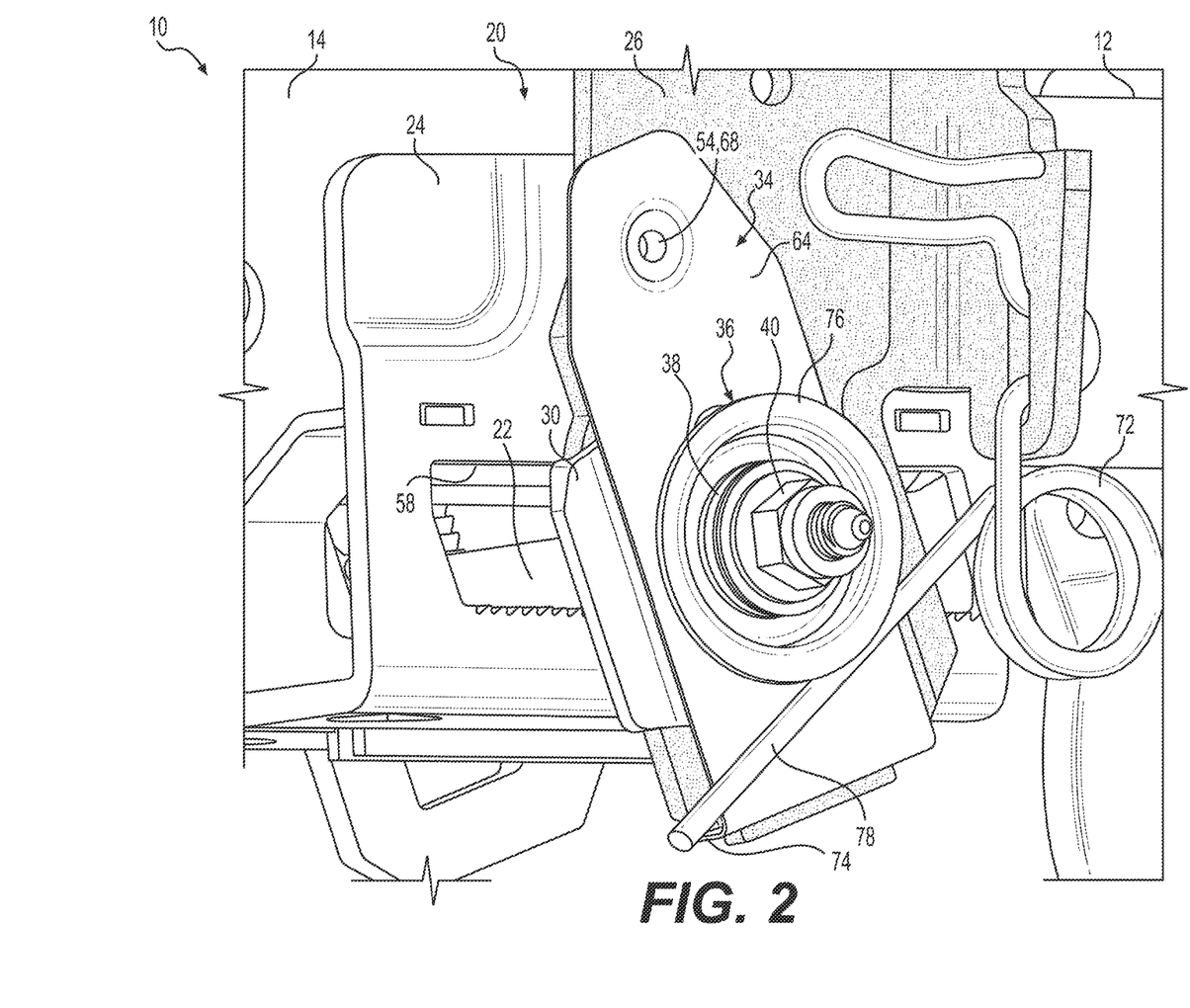
FIG. 2 depicts a perspective view of a clamp mechanism according to aspects of the present disclosure.

FIG. 2 depicts the clamp mechanism 20 within a steering column assembly 10. In addition to the clamp mechanism 20, the steering column assembly 10 includes an inner column jacket 12 and an outer column jacket 14 each configured to surround a steering shaft and configured to move telescopically for adjusting a length of the steering column assembly 10. The outer column jacket 14 extends outwardly toward a steering wheel and is fixed to the movable bracket 24. A biasing spring 72 is secured to the fixed bracket 26 and is configured to bias the adjustment bolt 22 upwardly to counteract the force of gravity acting upon the steering column assembly when the clamp mechanism 20 is in the adjustment position.

The second washer 36 is disposed around the adjustment bolt 22 and adjacent to the friction plate 34 with the friction plate 34 sandwiched between the first washer 32 and the second washer 36. The first washer 32 and the second washer 36 together clamp the friction plate 34 for securing the adjustment bolt 22 together with the friction plate 34 in the holding position. In some embodiments, and as shown in FIG. 2, the second washer 36 is configured as a flared washer 36 that extends in a plane perpendicularly to the adjustment bolt 22. The flared washer 36 includes a flared portion 76 extending transverse to the plane, the flared portion 76 is configured to receive a spring arm 78 of the biasing spring 72 for biasing the adjustment bolt 22 upwardly and toward an end of the first slotted aperture 48.

In some embodiments, and as also shown in FIG. 2, the friction plate 34 includes a distal standoff 74 extending perpendicularly to the plate body 64 towards the fixed bracket 26 and spaced apart from the second pivot hole 68 for maintaining the plate body 64 parallel to and spaced apart from the first side plate 46 of the fixed bracket 26. In some embodiments, the distal standoff 74 may be formed by a 90-degree bend in the friction plate along an edge of the friction plate 34. However, the distal standoff 74 may take other forms, such as a protrusion from either or both of the friction plate 34 and/or the fixed bracket 26.

Figure 3:
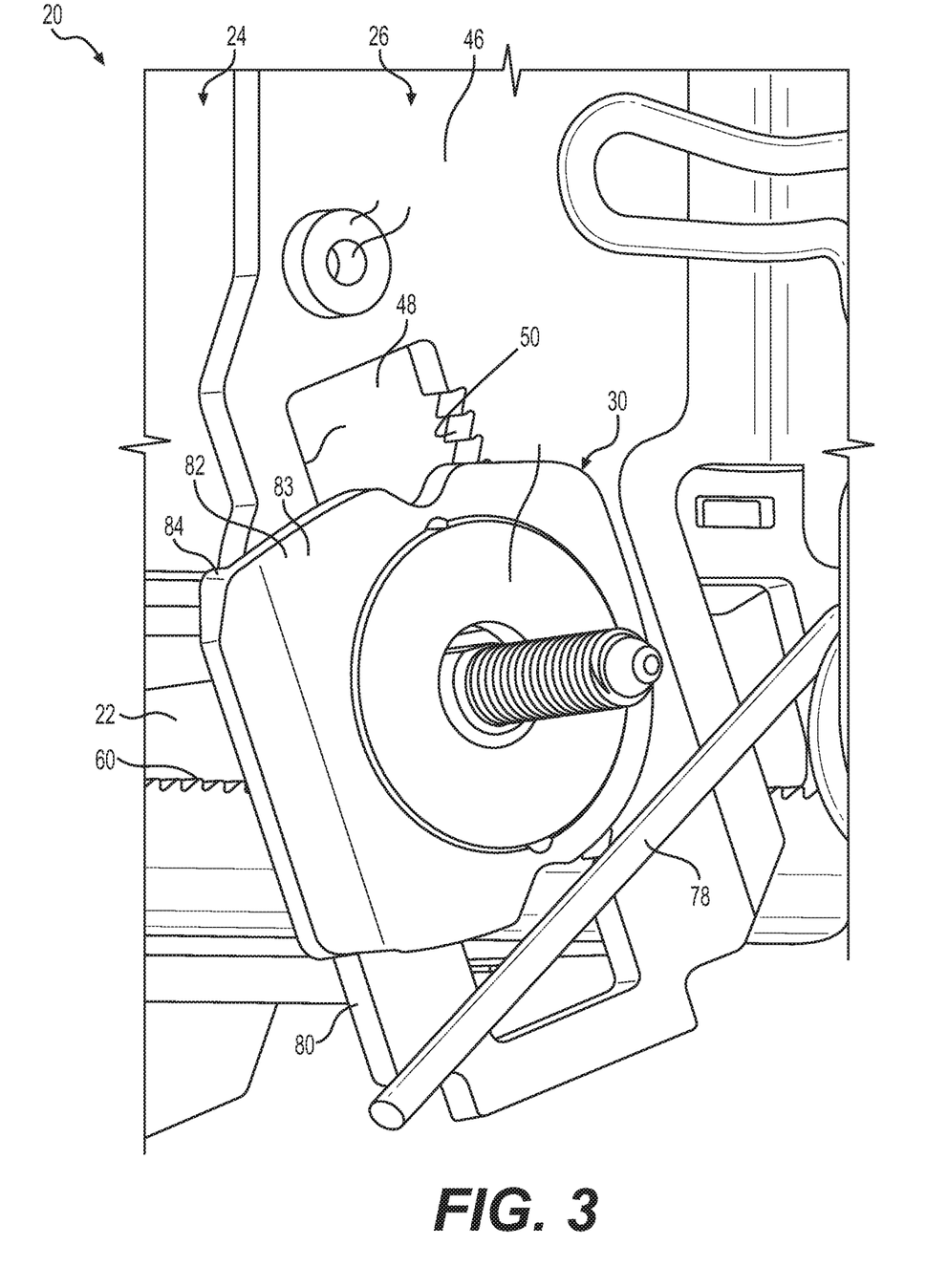
FIG. 3 depicts a perspective view of a lock retainer, a washer, and an adjustment bolt within the clamp mechanism of FIG. 1 according to aspects of the present disclosure.
Figure 4:
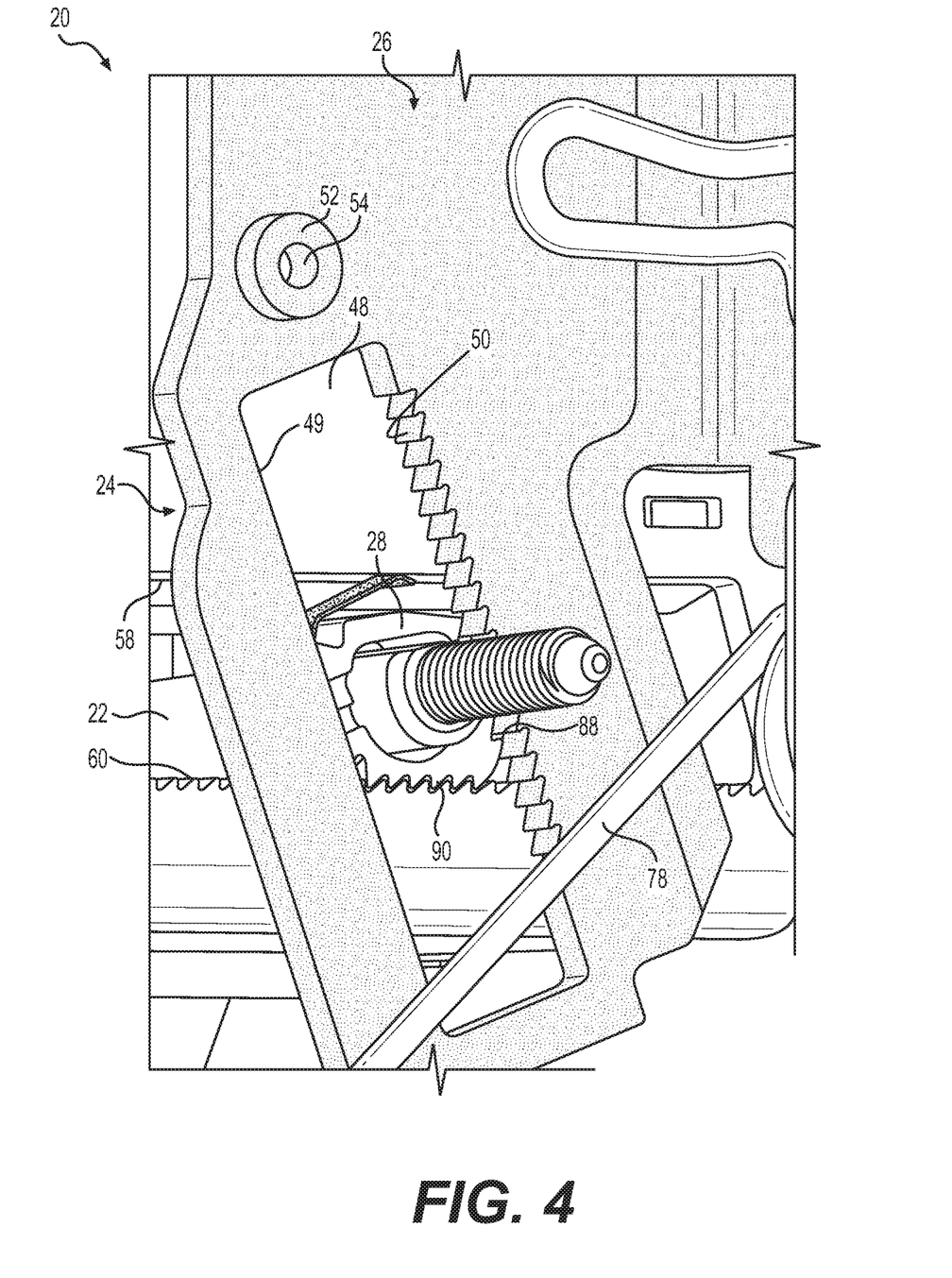
FIG. 4 depicts a perspective view of a positive locking member and an adjustment bolt within the clamp mechanism of FIG. 1 according to aspects of the present disclosure.

FIGS. 3-4 depict components within the clamp mechanism 20 in their assembled positions. Specifically, FIG. 3 shows the lock retainer 30 surrounding the first washer 32, with both of the lock retainer 30 and the first washer 32 flush against the first side plate 46 of the fixed bracket 26. The fixed bracket defining the first slotted aperture 48 having a generally rectangular shape extending for a length parallel and spaced apart from a flat side edge 80 of the fixed bracket 26. The lock retainer 30 includes a main body 82 extending between two flat faces 83. Each of the flat faces 83 extending parallel and adjacent to the first side plate 46 of the fixed bracket 26 with the lock retainer 30 in an installed position shown on FIG. 3. The lock retainer 30 also includes an exterior protrusion 84 in the form of a lip that extends along an edge of the main body 82 perpendicularly thereto for engaging the flat side edge 80 of the fixed bracket 26. FIG. 4 shows the positive locking member 28 disposed around the adjustment bolt 22 within the first slotted aperture 48 of the movable bracket 24 and also within the second slotted aperture 58 of the fixed bracket 26.

In some embodiments, and as shown on FIGS. 3-4, the fixed bracket 26 defines a plurality of first internal teeth 50 along at least one interior edge of the first slotted aperture 48. The first internal teeth 50 each have a triangular sawtooth shape, and the first internal teeth 50 extend approximately two-thirds of the length of the first slotted aperture 48, spaced apart from each of the ends of the first slotted aperture 48. The first internal teeth 50 may have other shapes or forms, such as a triangular, square, or trapezoidal shape. The first internal teeth 50 may extend to either or both ends of the first slotted aperture 48. The positive locking member 28 defines a plurality of first lock teeth 88 configured to engage corresponding ones of the first internal teeth 50 in a rake-lock position, blocking the adjustment bolt 22 from moving along the first slotted aperture 48, and thus preventing the steering column assembly 10 from moving in the tilting or raking degree of freedom.

In some embodiments, and as shown on FIGS. 3-4, the movable bracket 24 defines a plurality of second internal teeth 60 along at least one interior edge of the second slotted aperture 58. The second internal teeth 60 each have a triangular sawtooth shape, and the second internal teeth 60 extend the entire length of the second slotted aperture 58. The second internal teeth 60 may have other shapes or forms, such as a triangular, square, or trapezoidal shape. The second internal teeth 60 may extend for less than an entire length of the second slotted aperture 58, for example by stopping short of either or both ends of the second slotted aperture 58. The positive locking member 28 defines a plurality of second lock teeth 90 configured to engage corresponding ones of the second internal teeth 60 in a tele-lock position, blocking the adjustment bolt 22 from moving along the second slotted aperture 58, and thus preventing the steering column assembly 10 from moving in the telescopic degree of freedom.

Figure 5:
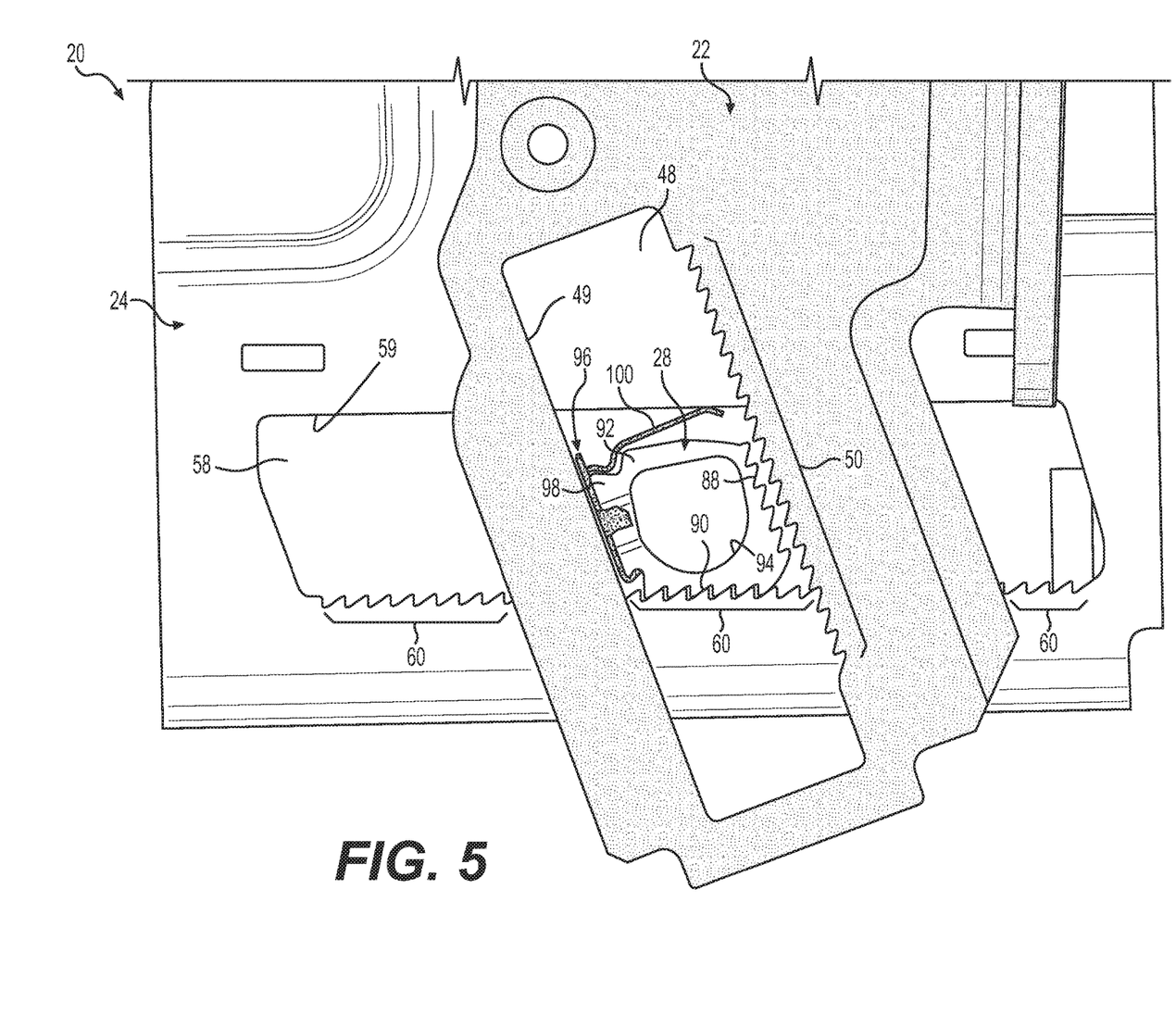
FIG. 5 depicts a side view of the positive locking member within the clamp mechanism of FIG. 1 according to aspects of the present disclosure.

FIG. 5 depicts a side view of the positive locking member 28 within the clamp mechanism 20. Specifically, FIG. 5 shows the positive locking member 28 in the tele-lock position, with the second lock teeth 90 engaging corresponding ones of the second internal teeth 60. FIG. 5 also shows the positive locking member 28 out of the rake-lock position, with the first lock teeth 88 not engaging corresponding ones of the first internal teeth 50, thus allowing the steering column assembly 10 to be moved in the tilting or raking degree of freedom. The positive locking member 28 includes a body 92 that defines a bore 94 having a D-shaped cross-section for receiving a corresponding-shaped section of the adjustment bolt 22. A spring clip 96 engages a dovetail protrusion 98 on the body 92 of the positive locking member 28. The spring clip 96 includes an anti-rattle spring arm 100 that is configured to engage the second elongate edge 59 of the movable bracket 24 for preventing rattle or chatter. The spring clip 96 may be fixed to the positive locking member 28 by other means, such as by an adhesive or using one or more fasteners.

Figure 6:
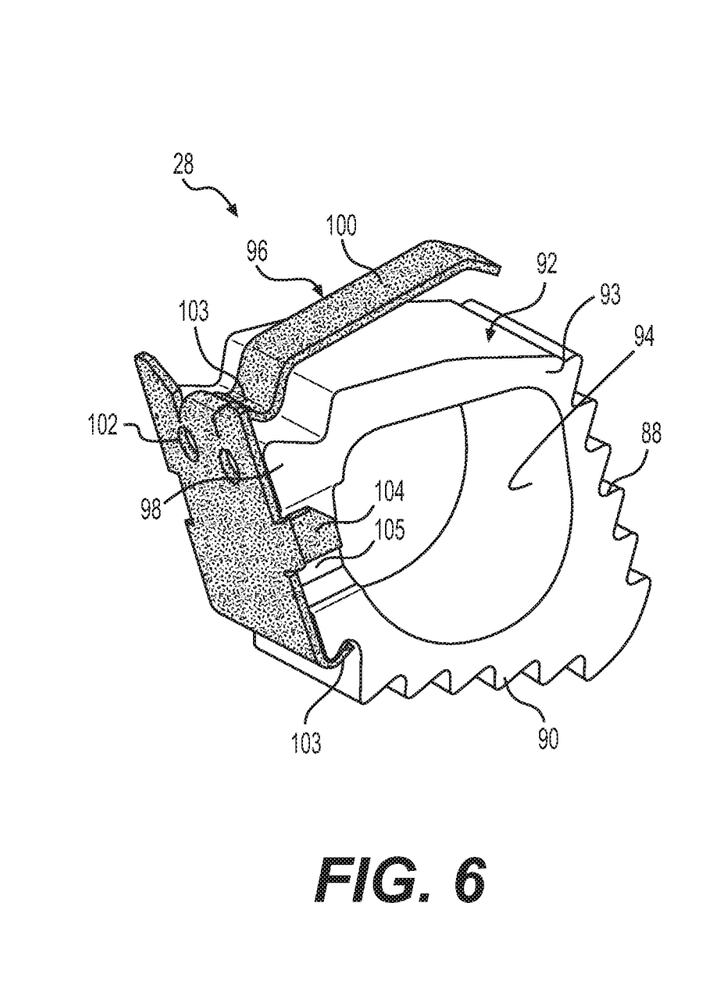
FIG. 6 depicts a perspective view of a positive locking member according to aspects of the present disclosure.

FIG. 6 depicts a perspective view of the positive locking member 28 including the body 92 extending between two parallel faces 93 that are parallel and spaced apart from one another. The spring clip 96 includes a base portion 102 that is flat and generally rectangular. Transverse portions 103 extend generally transversely from two opposite edges of the base portion 102 to wrap-around the dovetail protrusion 98 on the body 92 of the positive locking member 28. One of the transverse portions 103 continues further beyond the dovetail protrusion 98 and around a top side of the positive locking member 28 to define the anti-rattle spring arm 100. The spring clip 96 also includes a pair of flaps 104, with each of the flaps 104 extending transversely from a corresponding edge of the base portion 102 between the two transverse portions 103 for engaging the body 92 of the positive locking member 28. More specifically, each of the flaps 104 is disposed within a trough 105 within a corresponding one of the parallel faces 93 of the positive locking member 28 for holding the spring clip 96 thereupon.

Figure 7:
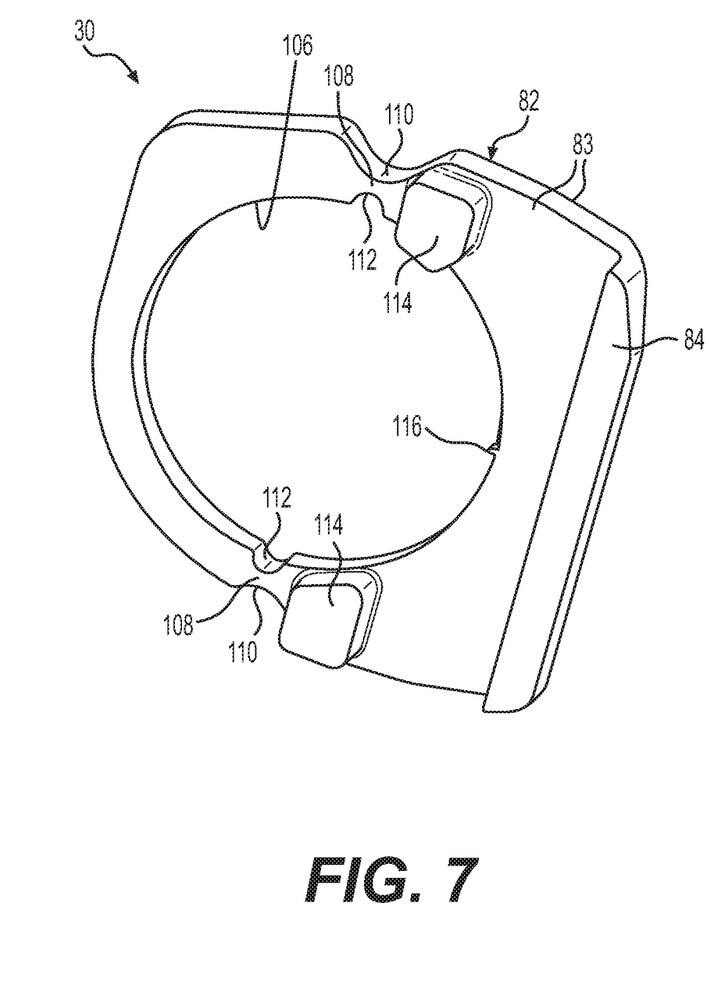
FIG. 7 depicts a perspective view of a lock retainer according to aspects of the present disclosure.

FIG. 7 depicts a perspective view of the lock retainer 30. FIG. 7 shows the main body 82 of the lock retainer 30 extending between the two flat faces 83 and defining a circular bore 106 that is configured to surround the first washer 32. The lock retainer 30 defines two frangible portions 108 that are configured to fracture under a crash load. The frangible portions 108 may also be called "fuses". In some embodiments, and as shown in FIG. 7, the frangible portions 108 comprise a thinned region of the main body 82 of the lock retainer 30. Specifically, the frangible portions 108 each extend between an indentation 110 in an exterior edge and a radial extension 112 extending radially outwardly from the circular bore 106, with each of the radial extensions 112 having an arch-shape extending outwardly toward a corresponding one of the indentations 110. The frangible portions 108 may include other physical configurations or features, such as a narrowing between the two flat faces 83 and/or a material that is more brittle or otherwise configured to break in response to a predetermined force generated by a crash of the vehicle.

FIG. 7 also shows the exterior protrusion 84 and a set of posts 114 all extending perpendicularly from one of the flat faces 83 of the main body 82 for engaging the flat side edge 80, and the first elongate edge 49 of the fixed bracket 26, respectively. Thus, the first washer 32 and the adjustment bolt 22 are held by the lock retainer 30 in a predetermined position or in a predetermined range of positions within the first slotted aperture 48 as long as the frangible portions 108 are intact. In some embodiments, the predetermined position or range of positions corresponds to the positive locking member 28 being in an unlocked position. Thus, the intact lock retainer 30 holds the adjustment bolt 22 a predetermined distance away from the first elongate edge 49, while allowing the positive locking member 28 and the adjustment bolt 22 to move along the first slotted aperture 48 for the steering column to move in the tilt or rake degree of freedom. Fracturing one or more of the frangible portions 108 causes the lock retainer 30 to cease holding the adjustment bolt 22 the predetermined distance away from the first elongate edge 49, and allowing the positive locking member 28 to be in the rake-lock position with the first lock teeth 88 engaging corresponding ones of the first internal teeth 50. The positive locking member 28, in the rake-lock position, blocks the adjustment bolt 22 from moving along the first slotted aperture 48, thus preventing the steering column assembly 10 from moving in the tilting or raking degree of freedom.

A nub 116 protrudes radially inwardly within the circular bore 106 is configured to provide an interference fit between the circular bore 106 and the first washer 32 and the main body 82 of the lock retainer 30 for preventing relative motion therebetween, thus preventing rattle or chatter therebetween. The lock retainer 30 may define two or more nubs 116, and the nubs 116 may take other forms or configurations.

In normal operation, the second lock teeth 90 of the positive locking member 28 are close to, but not engaged with, the second internal teeth 60. Under a crash load, the second lock teeth 90 of the positive locking member 28 engage the second internal teeth 60 within the second slotted aperture 58, and one or both of the two frangible portions 108 of the lock retainer 30 are configured to fracture. With the second lock teeth 90 engaging the second internal teeth 60, and with one or both of the frangible portions 108 fractured, the plurality of first lock teeth 88 engage corresponding ones of the first internal teeth 50. At this time, the positive locking member 28 can be said to be in the locked position. In this way, the positive locking member 28 is configured to move to the locked position in a crash event. The positive locking member 28 may move to the locked position in other cases (e.g. without a crash load), and/or by other means. For example, the positive locking member 28 may move to the locked position by fracturing one or more frangible portions 108 of the lock retainer 30 without second lock teeth 90 engaging second internal teeth 60.

Figure 8:
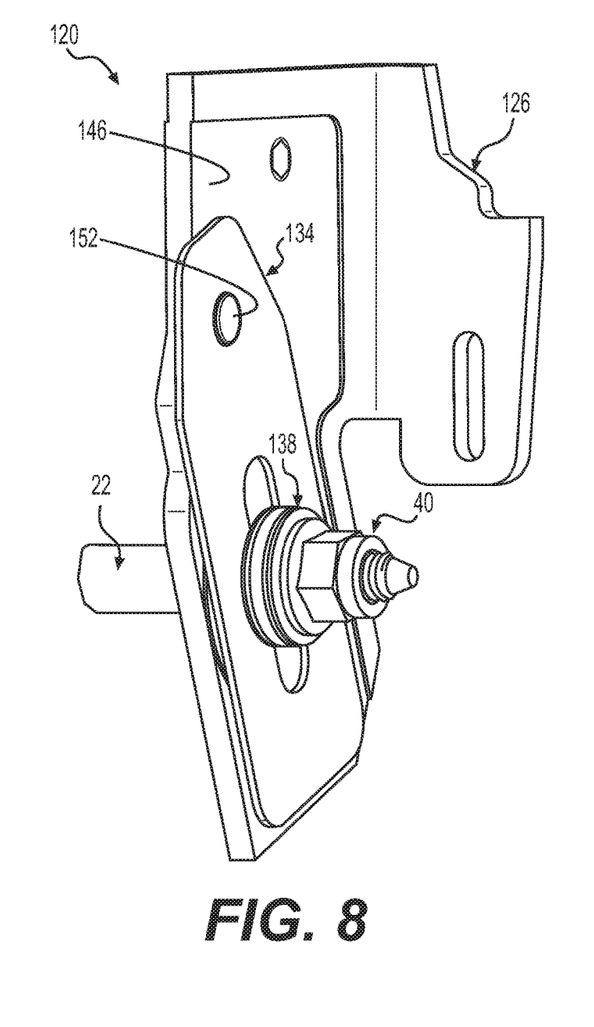
FIG. 8 depicts a perspective view of a clamp mechanism for an adjustable steering column according to aspects of the present disclosure.
Figure 9:
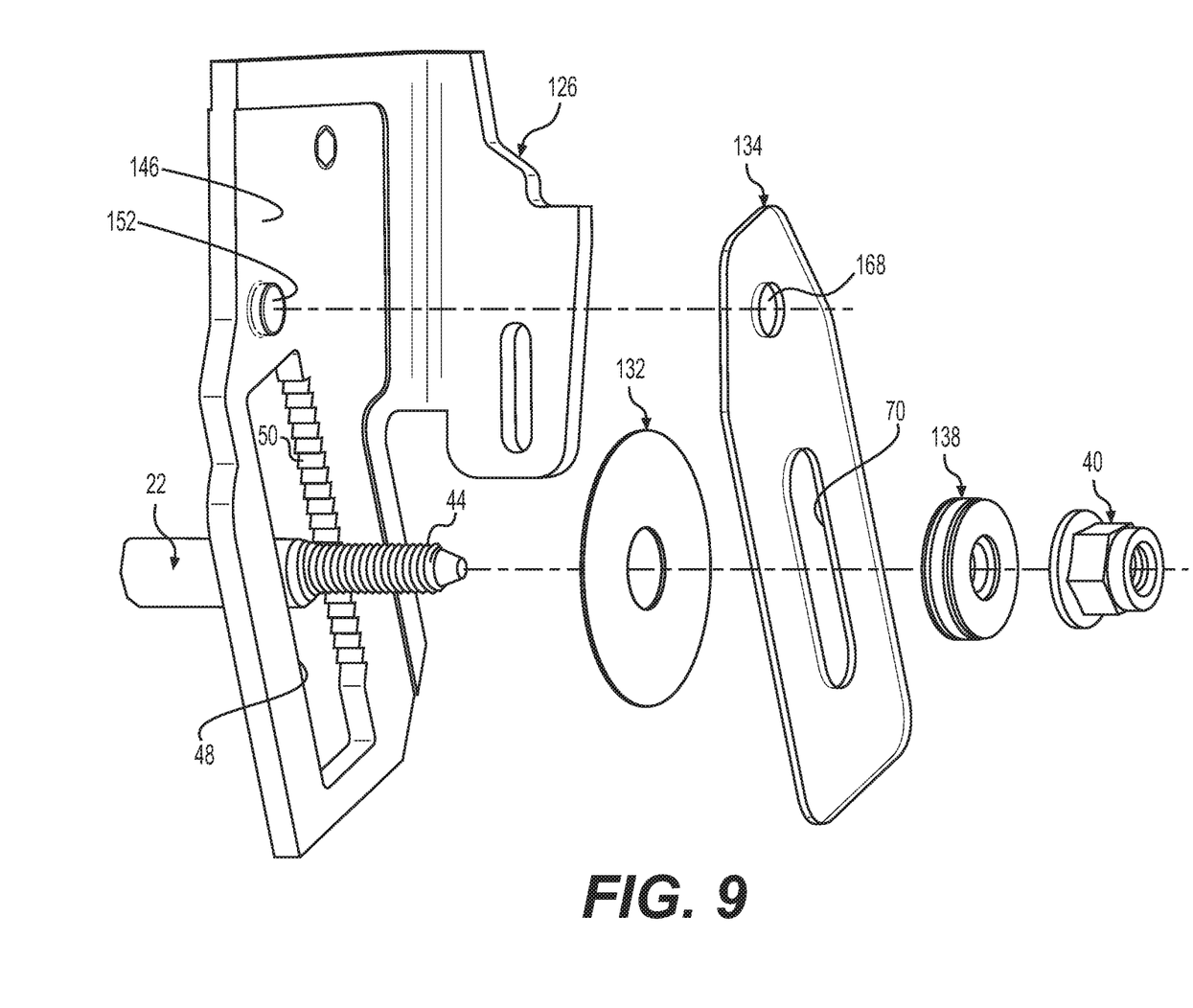
FIG. 9 depicts an exploded view of the clamp mechanism of FIG. 8 according to aspects of the present disclosure.

FIGS. 8-9 show a second clamp mechanism 120 that is similar but distinguishable from the clamp mechanism 20 shown in FIGS. 1-7. The second clamp mechanism 120 shown in FIGS. 8-9 does not include a lock retainer, although the second clamp mechanism 120 may be modified to incorporate a lock retainer.

The second clamp mechanism 120 includes a second fixed bracket 126 including a side plate 146 with a second stand-off protrusion 152 extending outwardly perpendicularly therefrom. The second fixed bracket 126 defines a first slotted aperture 48 having first internal teeth 50, which may be similar or identical to the corresponding parts on the fixed bracket 26 of the clamp mechanism 20 shown in FIGS. 1-7. The second clamp mechanism 120 also includes a second friction plate 134 that is generally flat and defining a pivot hole 168 for receiving the second stand-off protrusion 152 for pivotably coupling the second friction plate 134 with the second fixed bracket 126. The second clamp mechanism 120 also defines an adjustment slot 70 aligned with the first slotted aperture 48, allowing the adjustment bolt 22 to move along the first slotted aperture 48.

A first washer 132 extends around the adjustment bolt 22 and is disposed between the second fixed bracket 126 and the second friction plate 134. A second washer 138 is disposed around the adjustment bolt 22 between the second friction plate 134 and the adjustment nut 40 for clamping the second friction plate 134 therebetween with the adjustment nut 40 and the adjustment bolt 22 in a holding position. The second washer 138 is a compression washer that includes a resilient material, such as rubber, which is configured to deform by compression with the adjustment nut and the adjustment bolt in the holding position, for maintaining and/or regulating the clamping force applied to the second friction plate 134.

The second clamp mechanism 120 also includes a second positive locking member (not shown) configured to engage the first internal teeth 50 of the first slotted aperture 48 for blocking the adjustment bolt 22 from moving along the first slotted aperture 48 in the locked position. The second positive locking member may function similarly or identically to the positive locking member 28 of the clamp mechanism 20 shown in FIGS. 1-7. The second clamp mechanism 120 is compatible with a breakaway (fused type) lock retainer having a frangible portion or a non-breakaway type lock retainer that does not break under a crash load. For example, the second clamp mechanism 120 may be configured with a spring preload disengagement biasing for causing a positive locking member (not shown) to move between an unlocked position and a locked position. The second clamp mechanism 120 provides a minimal packaging height, having a smaller footprint than the clamp mechanism 20 of FIGS. 1-7. The second clamp mechanism 120 may accommodate additional stacking of plates and/or washers around the adjustment bolt 22 for increasing the clamping force on the second side plate 146, and thus increasing the holding load.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments.

Accordingly, the present disclosure is not to be seen as limited by the foregoing description.

What is claimed is:

1. A clamp mechanism for an adjustable steering column assembly of a vehicle comprising:
    a fixed bracket configured for rigid attachment to the vehicle;
    a movable bracket configured to hold a steering shaft;
    an adjustment nut threadedly engaging an adjustment bolt, at least one of the adjustment nut or the adjustment bolt movable between an adjustment position and a holding position to selectively couple the movable bracket to the fixed bracket in the holding position;
    the fixed bracket defining a first slotted aperture configured to guide the adjustment bolt in a linear path for adjusting a position of the steering shaft;
    a positive locking member movable between an unlocked position and a locked position, the positive locking member, in the locked position, blocking the adjustment bolt from moving along the first slotted aperture;
    a friction plate pivotably coupled to the fixed bracket and configured to pivot with the positive locking member moving between the unlocked position and the locked position;
    a lock retainer including a frangible portion configured to fracture under a crash load, the lock retainer configured to hold the positive locking member in the unlocked position with the frangible portion being intact; and
    wherein the positive locking member is movable to the locked position with the frangible portion of the lock retainer being fractured.

2. The clamp mechanism of claim 1, wherein the positive locking member is configured to hold the adjustment bolt in a fixed position relative to each of the fixed bracket and the movable bracket in the locked position.

3. The clamp mechanism of claim 1, wherein the positive locking member is configured to move to the locked position in a crash event.

4. The clamp mechanism of claim 1, further comprising:
    a washer disposed around the adjustment bolt and disposed parallel and adjacent to the friction plate for clamping the friction plate and securing the adjustment bolt therewith in the holding position.

5. The clamp mechanism of claim 4, wherein the washer is a first washer disposed between the fixed bracket and the friction plate; and further comprising:
    a second washer disposed around the adjustment bolt and disposed parallel and adjacent to the friction plate with the friction plate disposed between the first washer and the second washer, the first washer and the second washer together clamping the friction plate and securing the adjustment bolt therewith in the holding position.

6. The clamp mechanism of claim 1, wherein the friction plate defines an adjustment slot extending parallel to the first slotted aperture of the fixed bracket with the positive locking member in the unlocked position; and
    the adjustment bolt extending through the adjustment slot and configured to move within the adjustment slot as the adjustment bolt moves along the first slotted aperture for adjusting the position of the steering shaft.

7. The clamp mechanism of claim 1, wherein the lock retainer includes a protrusion configured to engage the fixed bracket for holding the adjustment bolt in a predetermined position within the first slotted aperture with the frangible portion being intact.

8. The clamp mechanism of claim 1, wherein the lock retainer is disposed annularly around a washer, with the washer disposed around the adjustment bolt.

9. A clamp mechanism for an adjustable steering column assembly of a vehicle comprising:
    a fixed bracket configured for rigid attachment to the vehicle;
    a movable bracket configured to hold a steering shaft;
    an adjustment nut threadedly engaging an adjustment bolt, at least one of the adjustment nut or the adjustment bolt movable between an adjustment position and a holding position to selectively couple the movable bracket to the fixed bracket in the holding position;
    the fixed bracket defining a first slotted aperture configured to guide the adjustment bolt in a linear path for adjusting a position of the steering shaft;
    a positive locking member movable between an unlocked position and a locked position, the positive locking member, in the locked position, blocking the adjustment bolt from moving along the first slotted aperture;
    a friction plate pivotably coupled to the fixed bracket and configured to pivot with the positive locking member moving between the unlocked position and the locked position; and
    a flared washer disposed around the adjustment bolt, the flared washer extending in a plane perpendicularly to the adjustment bolt and including a flared portion extending transverse to the plane, the flared portion configured to receive a spring for biasing the adjustment bolt toward an end of the first slotted aperture.

10. A clamp mechanism for an adjustable steering column assembly of a vehicle comprising:
    a fixed bracket configured for rigid attachment to the vehicle;
    a movable bracket configured to hold a steering shaft;
    an adjustment nut threadedly engaging an adjustment bolt, at least one of the adjustment nut or the adjustment bolt movable between an adjustment position and a holding position to selectively couple the movable bracket to the fixed bracket in the holding position;
    the fixed bracket defining a first slotted aperture configured to guide the adjustment bolt in a linear path for adjusting a position of the steering shaft;
    a positive locking member movable between an unlocked position and a locked position, the positive locking member, in the locked position, blocking the adjustment bolt from moving along the first slotted aperture;
    a friction plate pivotably coupled to the fixed bracket and configured to pivot with the positive locking member moving between the unlocked position and the locked position;
    the fixed bracket defining a plurality of first internal teeth along an interior edge of the first slotted aperture; and
    the positive locking member defining at least one lock tooth configured to engage one of the plurality of first internal teeth in the locked position.

11. A clamp mechanism for an adjustable steering column assembly of a vehicle comprising:
    a fixed bracket configured for rigid attachment to the vehicle;
    a movable bracket configured to hold a steering shaft;
    an adjustment nut threadedly engaging an adjustment bolt, at least one of the adjustment nut or the adjustment bolt movable between an adjustment position and a holding position to selectively couple the movable bracket to the fixed bracket in the holding position;

the fixed bracket defining a first slotted aperture configured to guide the adjustment bolt in a linear path for adjusting a position of the steering shaft;

a positive locking member movable between an unlocked position and a locked position, the positive locking member, in the locked position, blocking the adjustment bolt from moving along the first slotted aperture;

a friction plate pivotably coupled to the fixed bracket and configured to pivot with the positive locking member moving between the unlocked position and the locked position;

the movable bracket defining a second slotted aperture extending transverse to the first slotted aperture, the second slotted aperture configured to guide the adjustment bolt in a second linear path for adjusting a length of the steering shaft;

the movable bracket defining a plurality of second internal teeth along an interior edge of the second slotted aperture; and the positive locking member defining at least one lock tooth configured to engage one of the plurality of second internal teeth in the locked position.

12. The clamp mechanism of claim 11, wherein the positive locking member, in the locked position, blocks the adjustment bolt from moving along the second slotted aperture.

13. An adjustable steering column assembly for a vehicle, comprising:
a steering shaft;
a fixed bracket configured for rigid attachment to the vehicle;
a movable bracket fixed to the steering shaft;
an adjustment nut threadedly engaging an adjustment bolt, at least one of the adjustment nut or the adjustment bolt movable between an adjustment position and a holding position and configured to selectively couple the movable bracket to the fixed bracket in the holding position;

at least one of the fixed bracket and the movable bracket defining a slotted aperture configured to guide the adjustment bolt in a linear path;

a positive locking member movable between an unlocked position and a locked position, the positive locking member, in the locked position, blocking the adjustment bolt from moving along the slotted aperture;

a friction plate pivotably coupled to the fixed bracket and configured to pivot with the positive locking member moving between the unlocked position and the locked position;

a lock retainer including a frangible portion configured to fracture under a crash load, the lock retainer configured to hold the positive locking member in the unlocked position with the frangible portion being intact; and wherein the positive locking member is movable to the locked position with the frangible portion of the lock retainer being fractured.

14. The adjustable steering column assembly of claim 13, wherein the slotted aperture comprises a first slotted aperture in the fixed bracket.

15. The adjustable steering column assembly of claim 13, wherein the slotted aperture comprises a second slotted aperture in the movable bracket.

16. The adjustable steering column assembly of claim 13, wherein the slotted aperture comprises a first slotted aperture in the fixed bracket; and
wherein the slotted aperture comprises a second slotted aperture in the movable bracket.

17. The adjustable steering column assembly of claim 13, wherein the positive locking member is configured to hold the adjustment bolt in a fixed position relative to each of the fixed bracket and the movable bracket in the locked position.

* * * * *